United States Patent [19]
Whitt

[11] 3,894,956
[45] July 15, 1975

[54] LUBRICANT COMPOSITION AND WICKING MATERIAL THEREFOR

[75] Inventor: James A. Whitt, Fort Wayne, Ind.

[73] Assignee: General Electric Company, Fort Wayne, Ind.

[22] Filed: Oct. 18, 1973

[21] Appl. No.: 407,635

Related U.S. Application Data

[63] Continuation-in-part of Ser. No. 292,664, Sept. 27, 1972, abandoned.

[52] U.S. Cl.............. 252/14; 5/361 B; 210/40; 210/DIG. 21; 260/2.5 AD; 260/2.5 AL
[51] Int. Cl..... C10m 5/20; C10m 7/34; C10m 7/30
[58] Field of Search........... 252/13, 14; 260/2.5 AL, 260/2.5 AD; 5/361 B; 210/40, DIG. 21

[56] References Cited
UNITED STATES PATENTS

| | | | |
|---|---|---|---|
| 2,960,371 | 11/1960 | Staak | 252/14 |
| 3,147,216 | 9/1964 | Oemler | 210/DIG. 21 |
| 3,480,547 | 11/1969 | Van Dyk | 252/14 |
| 3,657,125 | 4/1972 | Strickman | 210/DIG. 21 |
| 3,770,627 | 11/1973 | Alquist et al. | 210/40 |
| 3,800,950 | 4/1974 | Hess et al. | 210/DIG. 21 |
| 3,812,031 | 5/1974 | McCoy | 210/40 |

*Primary Examiner*—Delbert E. Gantz
*Assistant Examiner*—I. Vaughn
*Attorney, Agent, or Firm*—Joseph E. Papin

[57] ABSTRACT

A lubricant retaining and wicking material for releasably retaining a liquid lubricant. The lubricant retaining and wicking material comprises a mass of discrete, non-fibrous, multi-digited, resilient-type foam particles wherein a major portion of the particles are within a range size between approximately 20-mesh and approximately 80-mesh with the remaining particles of the mass having sizes generally between about 5-mesh and about 200-mesh exclusively of the major portion size range. A lubricant composition, methods of forming such, and a lubrication system are also disclosed.

37 Claims, 12 Drawing Figures

SHEET 1

LUBRICANT COMPOSITION AND WICKING MATERIAL THEREFOR

CROSS REFERENCE TO RELATED APPLICATION

This application is a continuation-in-part of my copending application Ser. No. 292,664, filed Sept. 27, 1972, now abandoned, which is specifically incorporated by reference herein.

FIELD OF THE INVENTION

This invention relates generally to wicking materials for use in lubricating various apparatus and in particular to a foam particulate lubricant retaining and wicking material, a lubricant composition including such foam particulate lubricant retaining and wicking material, methods of forming a lubricant composition, and a lubricating system utilizing the lubricant composition.

BACKGROUND OF THE INVENTION

In the past, various lubricant compositions, which included wicking materials, were well known in the art and commercially available for use in lubricating various apparatus, such as electric motors for instance. The past known commercially available wicking type lubricants were composed of various fibrous materials, such as cellulose and synthetic fibers, including wood fibers, cotton fibers, nylon fibers, rayon fibers and the like. One form of lubricant composition, such as an oil impregnated, fibrous wicking material, is commercially available under the trademark "PERMAWICK" from the Permawick Company of Detroit, Michigan. U.S. Pat. No. 2,966,459, issued Dec. 27, 1960, to M. L. Abel for "Material Having Oil Retaining Properties" describes a lubricant composition composed of cellulose fibers and a lubricating oil. The cellulose fibers, which form the oil absorbing part of the wicking material, are made from wood fibers and a mixture of paper-containing fibers of wood, cotton and the like. U.S. Pat. No. 3,214,375, issued Oct. 26, 1965, to B. Berkeley for "Lubricated Wicking Material" discloses an oil impregnated fibrous wicking material in which the wicking material is a blend of cellulose and synthetic fibers, such as nylon or rayon fibers. The cellulose fibers are described as being coated, at least in part, with a coating of polyvinyl alcohol. U.S. Pat. No. 3,466,244, issued Sept. 9, 1969, to M. L. Abel for "Oil-Impregnated Wicking Material" describes a lubricant composition or lubricating oil impregnated wicking material formed of cotton linter fibers. Each of the above three patents is assigned to the Permawick Company, and these patents described commercially available permawick extrudable lubricating materials, the wicking material in each instance having a distinctly fibrous structure. It is believed that at least one of the disadvantageous features of these patents was that such lubricant compositions only had a capacity for releasing a minor portion of the liquid lubricant thereof.

U.S. Pat. No. 2,960,371, issued Nov. 15, 1960, to L. E. Staak for "Bearing Lubricating Structure" and U.S. Pat. No. 2,979,779, issued Apr. 18, 1961 to L. E. Staak for "Improved Method of Providing a Bearing Lubricating Structure" both describe an oil impregnated lubricating structure formed by foaming an epoxy or phenolic material in place directly in a bearing housing thereby to form a unitary cellular foam structure in the bearing housing. After the foam is formed in place in the bearing housing, the foam is impregnated with an appropriate lubricating oil.

The use of fibers of glass, asbestos, and the like as fillers for lubricating compounds is also known in the art. U.S. Pat. No. 2,303,068, issued Nov. 24, 1942, to G. H. Schoembaum for "Lubricant And Preparation Thereof" describes the use of asbestos fibers as a filler to form a viscous lubricating composition. U.S. Pat. No. 3,113,105, issued Dec. 3, 1963, to G. Slayter et al describes a silicone fluid lubricant incorporating short lengths of fibrous glass to form a lubricant composition for use at high temperatures.

Many bearing structures with which wicking type lubricants of the type known in the art have been used employed felt feeder wicks. See, for example, U.S. Pat. No. 3,434,765, issued Mar. 25, 1969, to M. L. Abel for "Lubricating Bearing Assembly and Method of Marking Same", and U.S. Pat. No. 3,184,272, issued May 18, 1965, to A. J. Ridgway for "Lubricating Means for a Rotatable Device." In such constructions, it is desirable that the lubricant impregnated or wicking material release the lubricating oil which it contains at a rate and in an amount sufficient to maintain a steady flow of lubricant through the felt wick to the rotating structure to be lubricated. A significant problem confronting the art resides in the disadvantageous feature that many of the lubricant compositions or extrudable lubricant impregnated wicking materials heretofor known, while capable of being extruded or otherwise packed into the bearing structure, were capable of releasing only a relatively small or minor portion of the total amount of lubricating oil contained therein. The smaller the releasable proportion of oil, the shorter the life of the lubricant, and hence of the bearing structure itself. Furthermore, the unreleased portion of the lubricant obviously was not available to perform the intended lubricating function.

SUMMARY OF THE INVENTION

Among the several objects of the present invention may be noted the provision of a lubricant retaining and wicking material, a lubricant composition, methods of making such, and a lubrication system utilizing the lubricant composition which overcome the disadvantageous or undesirable features of the prior art, as discussed hereinbefore as well as others; the provision of a lubricant retaining and wicking material formed from a foamed polymer material; the provision of a lubricant retaining and wicking material having a mass of foam particles with physical characteristics of being generally discrete, multi-digited, non-fibrous and resilient; the provision of a lubricant composition including such lubricant retaining and wicking material which exhibits an improved and increased liquid lubricant release capacity; the provision of a lubricant composition including such lubricant retaining and wicking material which has liquid lubricant release and transmission characteristics similar to that of conventional storage wicking material; the provisions of a lubricant composition including such lubricant retaining and wicking material which exhibits improved moisture resistance and is resistant to leaching of liquid lubricant contained therein when subjected to a wet, moist or humid environment; the provision of a simple and economical method of forming such lubricant composition; the provision of a lubrication system which exhibits a long useful life in both dry and humid atmospheres with minimum re-oiling requirements; and a provision of a lubrication system for a bearing assembly of apparatus in which the lubricant composition utilized as a storage wicking means has the capacity to release at least a major portion of the liquid lubricant contained therein to feeder wicking means for the bearing assembly. Other objects and advantageous features of the present invention will be in part apparent and in part pointed out hereinafter.

In general, lubricant retaining and a wicking material of the present invention for releasably retaining a liquid lubricant has a mass of discrete, non-fibrous, multi-digited, resilient-type foam particles wherein a major portion of the particles are within a size range between approximately 20-mesh and approximately 80-mesh with the remaining particles of the mass having sizes generally between about 5-mesh and about 200-mesh exclusively of the major portion size range. More particularly, the lubricant retaining and wicking material may be a synthetic polymeric material, such as a polyester-type or polyether-type polyurethane foam or the like, which is comminuted or otherwise formed into the desired range of particulate sizes.

Further and in general, a lubricant composition in one form of the present invention for lubricating a component which may be communicated therewith comprises a mixture of a liquid lubricant, and a means for both retaining and releasing the liquid lubricant adapted to effect the lubrication of the component, the retaining and releasing means being generally constituted by a particulate mass of discrete non-fibrous, multi digital, resilient-type foam particles. More particularly, the foam particles are comminuted or otherwise formed from a synthetic polymeric material which is substantially inert to and insoluble in the liquid lubricant, and the liquid lubricant and foam particles may be mixed in ranges of about between 70 and 80 percent by weight of lubricating liquid and about between 20 to 30 percent by weight of the foam particles.

Also in general, a method in one form of this invention for forming a lubricant composition adapted for lubricating a component which may be communicated therewith comprises reducing a resilient-type foamed polymer material to a particulate mass of discrete, non-fibrous, multi-digited resilient-type foam particles and saturating generally the resilient-type foam particles with a liquid lubricant by mixing them together thereby to form the lubricant composition. More particularly, the particles may have sizes in the range of approximately between about 5-mesh and about 200-mesh, and the liquid composition thus formed may be packed by hand or by the use of commercially available extruding equipment into a bearing cavity. Further in general, a method in one form of the invention is provided for forming a lubricant composition. In this forming method, a resilient-type foamed polymer material is reduced to a particulate mass of discrete, non-fibrous, multi-digited, resilient-type foam particles, and at least a portion of the particulate mass is mixed with a liquid lubricant. Thereafter, the foam particles and liquid lubricant mixture is comminuted further thereby forming the lubricant composition.

In addition and also in general, a lubricant system of the present invention for a bearing assembly in a lubricant cavity therefor comprises lubricant storage wicking means, and lubricant feeding wicking means disposed in interfacing and lubricant transferring relation between the lubricant storage means and the bearing assembly, the lubricant storage wicking means including a particulate mass of discrete, non-fibrous, multidigited, resilient-type foam particles impregnated with a liquid lubricant and having the capacity to release at least a major portion of the liquid lubricant to the lubricant feeding wicking means.

DESCRIPTION OF THE DRAWINGS

Corresponding reference characters indicate corresponding parts throughout the several views of the drawings.

The following examples illustrate the invention and are not to be construed as limiting in any manner.

DESCRIPTION OF THE PREFERRED EMBODIMENT

Referring now to the drawings in general, there is shown at 1 a lubricant retaining and wicking material in one form of the invention for releasably retaining a liquid lubricant 3, and the wicking material is a mass of discrete, non-fibrous, multi-digital, resilient-type foam particles 5 (FIGS. 2–4), as discussed in detail hereinafter. Further, a lubircant composition 7 of this invention is a mixture of a particulate mass of foam particles 5 and liquid lubricant 3. Wicking material 1 and lubricant composition 7 find particular, but not exclusive, utility for use in lubricating bearing means or the like of various apparatus, such as dynamoelectric machines or the like for instance.

In a lubrication system in one form of the invention, indicated generally at 9 (FIG. 1), a bearing means or assembly, such as a tin babbitt metal sleeve bearing 10 or the like, is supported in a structural member, such as an end shield 11 or the like, of apparatus, such as a dynamoelectric machine or the like (not shown), and a rotatable member, such as a shaft 12, is rotatably supported in the end shield and journaled in the bearing means. End shield 11 together with an end cap 14 and an oil well cover 15 define a lubricant chamber or cavity 16 for receiving and retaining lubricant storage wicking means, such as lubricant composition 7. For transmitting liquid lubricant or oil 3 from lubricant composition 7 to bearing 10 and shaft 12, a feeder wicking means, such as a wool felt wick 19 or the like well known to the art, is conventionally disposed in interfacing and lubricant transmitting relation between the lubricant composition and the peripheral or journaled surface of rotatable shaft 12 extending through an opening or window 20 in bearing 10. Return means, such as an oil thrower or slinger 21, is mounted on shaft 12 in a manner well known in the art for returning or slinging oil, which flows from the feeder wicking means 19 between the bearing 10 and shaft, back into storage in lubricant composition 7. While there may be some applications where lubricant composition 7 might be utilized in direct lubricant transferring relation or engagement with shaft 12, the preferred application is to utilize the liquid composition in interfacing and lubricant transferring relation with feeder wicking means 19, as described above. Further, the construction of lubrication system 9 is illustrative only, and it, as well as lubrication composition 7, is not intended to be limited to the particular sleeve bearing 10 shown. See also, for example, the bearing structures shown in U.S. Pat. Nos. 2,966,459, 3,434,765, 3,184,272 and 2,960,371 referred to above.

Figure 2:
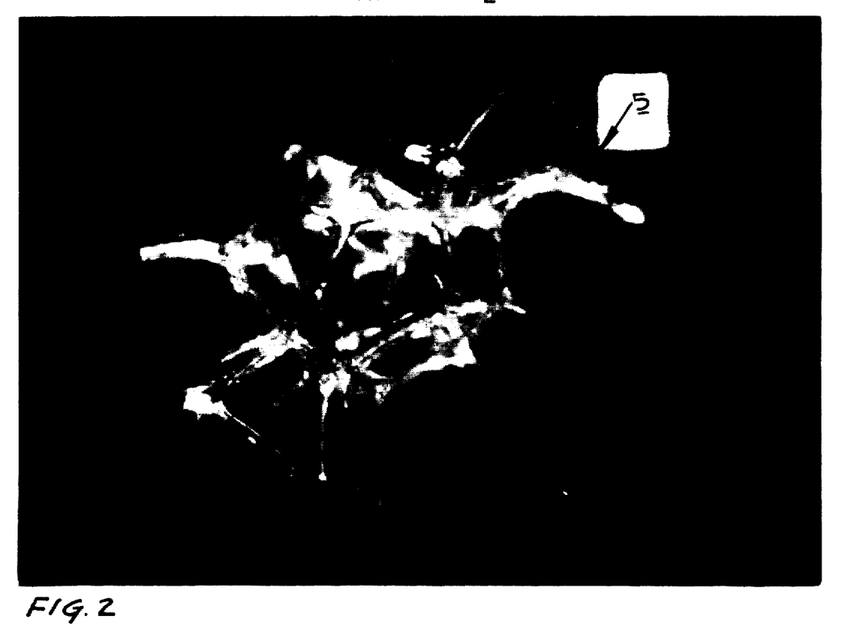
FIG. 2 is a photomicrograph of 40X magnification of polymer foam particles in one form of the invention having a size between about 20 and 35 mesh.
Figure 3:
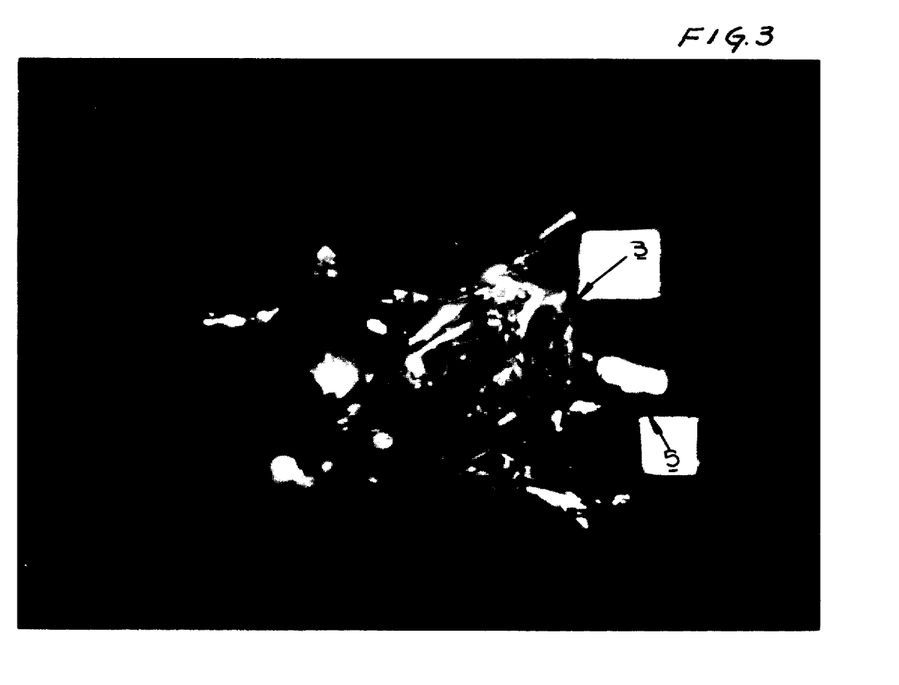
FIG. 3 is a photomicrograph of 40X magnification of a polymer foam particle similar to that of FIG. 2 and mixed with a liquid lubricant.
Figure 4:
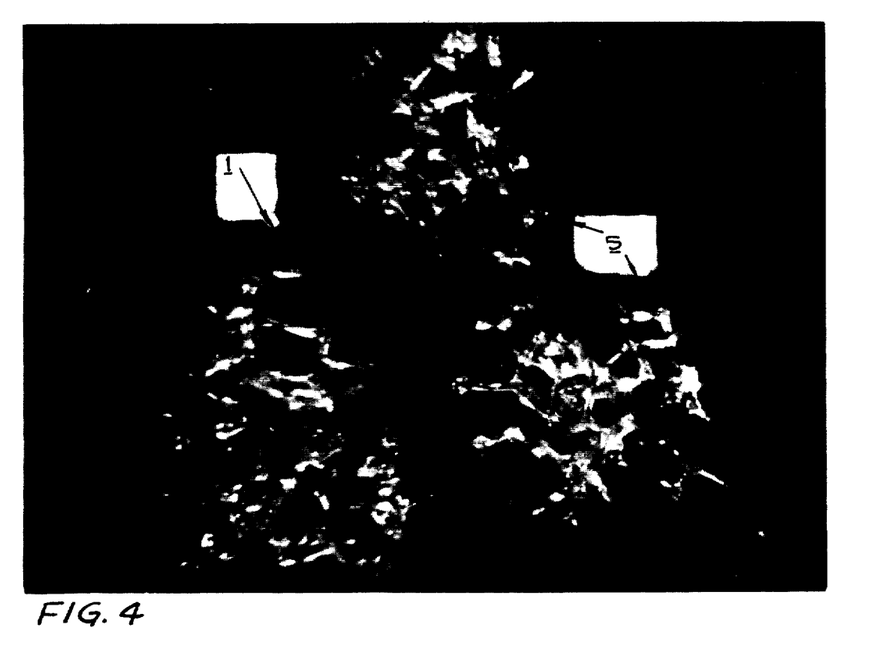
FIGS. 4 and 4a are photomicrographs of 20X magnification showing polymer foam particles having sizes of about 20 mesh and 35 mesh, respectively.
Figure 4A:
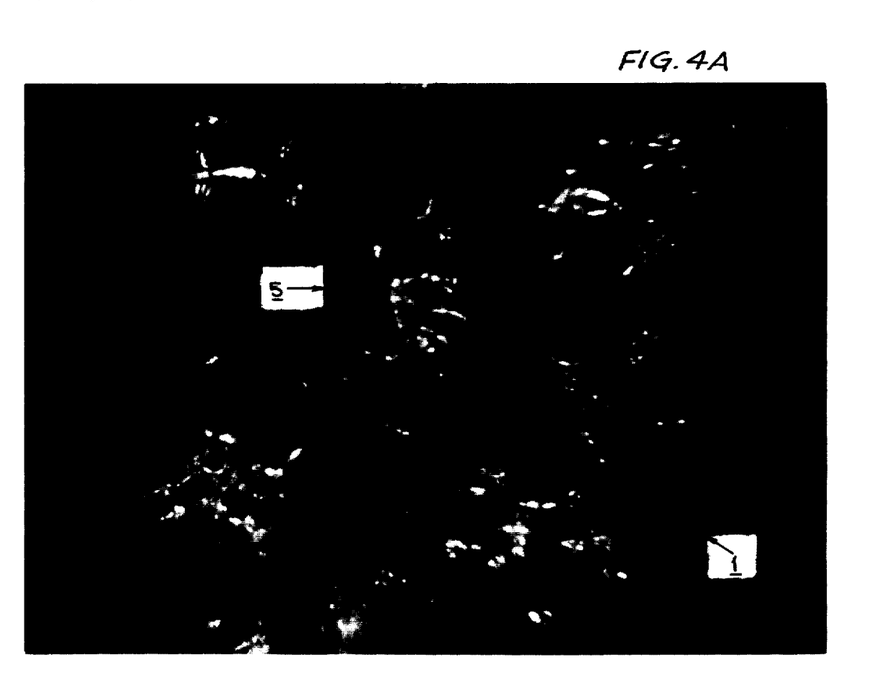

More particularly, and referring now to FIGS. 2–4 in detail, wicking material 1 is a mass of discrete, multi-digited, non-fibrous, resilient, synthetic polymeric foam particles 5 which are substantially inert to and substantially insoluble in liquid lubricant 3 to be carried by the wicking material. Particulate polymeric foam wicking material 1 is formed by first producing a polymer foam which is of a resilient, cellular structure, such as the widely known polyurethane foams. The foamed resilient polymer is then comminuted or otherwise reduced to particle sizes preferably smaller than about 8-mesh, and more particularly to a particle size such that a major portion, such as a range of from about 65 to about 85 percent of particles 5, pass a 20-mesh screen and only about 2 to about 10 percent passes an 80-mesh screen.

The polymeric foam particles 5 utilized are produced from the fracturing of the cellular structure, that is fracturing or rupturing both the cell ribs and the cell walls, of the foamed polymer, to produce the particulate mass of discrete and highly irregular, branched, or multi-digited, resilient, non-fibrous foam particles 5. It may be noted that foam particles 5 not only have a large surface area being highly angular and irregular but also are generally multi-angled and multi-digited particles capable of physically retaining a high volume of liquid lubricant 3, such as a lubricating oil, as compared to the volume and weight of the wicking material 1 itself.

Figure 5:
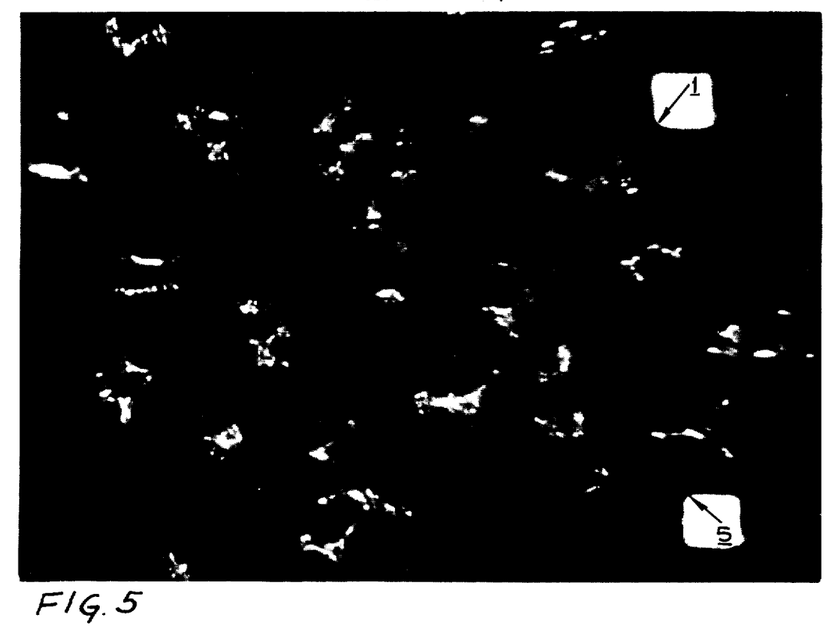
FIGS. 5 and 5a are photomicrographs of 20X magnification having sizes of about 60 mesh and 100 mesh, respectively.
Figure 5A:
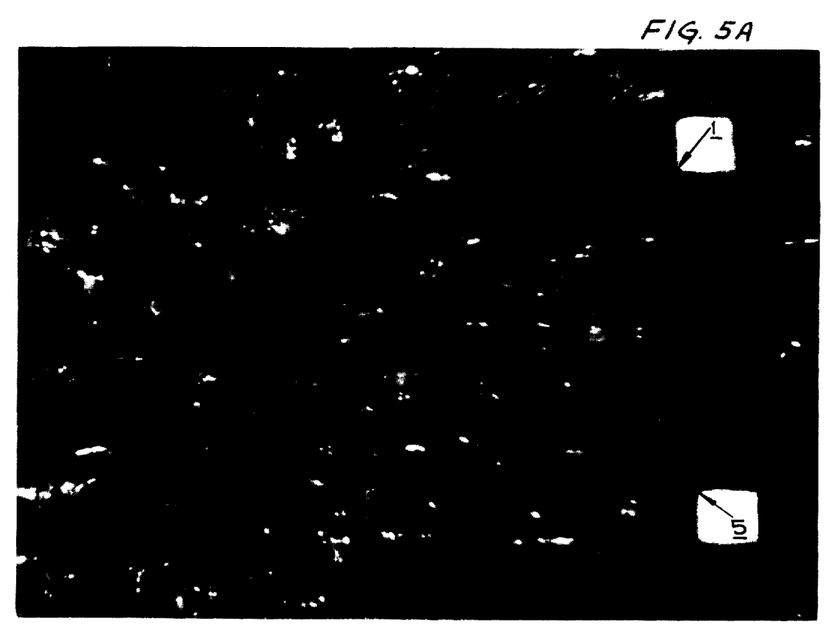

Referring to FIGS. 2 and 3, the structure of the polymeric, non-fibrous, particulate wicking material 1 is shown substantially magnified for clarity. The highly irregular, multi-digited, non-fibrous, angular nature of foam particles 5 appears in the photomicrographs shown in FIGS. 2 and 3. In addition, it may also be noted that foam particles 5 alone and in conjunction with each other provide a highly voluminous, resilient, low density, wicking material 1 capable of absorbing many times its weight in liquid lubricant 3, as may be seen in the photomicrographs of FIGS. 4 and 5.

Lubricant composition 7 for lubricating a component which may be communicated therewith is formed of a mixture of a liquid lubricant, such as lubricating oil 3, and means for both retaining and releasing the liquid lubricant adapted to effect the lubrication of the component, the retaining and releasing means being generally constituted by a particulate mass of non-fibrous, polymeric material, such as the discrete, non-fibrous, multi-digited, resilient-type foam particles 5 of wicking material 1, described above. While comminuting of the polymeric foam may be accomplished in a separate step, the foamed polymer may be flaked, cut or otherwise reduced into smaller pieces or particles, mixed with the lubricant fluid and further comminuted to the desired particulate size, as described above, in an appropriate comminutor or other like apparatus.

Among the polymeric materials which have been found useful in connection with the present invention are the widely known resilient polyurethane foams, of both the ester and the ether type. These foams are well known in the art and are widely available from a variety of commercial sources under the general designation of "polyurethane" foam. The principal characteristic of the polymeric foam, such as a polyurethane foam, forming wicking material 1 is that the foam be characterized as "resilient" as distinguished from "rigid" when in block form. As used herein, the terms distinguish between foam materials which give or yield to the touch and, when squeezed by hand, revert to substantially their original configuration, and the relatively rigid foam materials which crush or fracture when squeezed by hand and do not revert to their original configuration after squeezing. The desired resilient or spongy foam materials retain their characteristic resilient feel after comminution or reduction, whereas rigid foam materials retain a brittle, non-resilient characteristic after comminution or granulation. It is believed that other polymeric foams having the desired characteristics of the above-discussed foam particles 5 of wicking material 1 may also work, such as silicone foam commercially available from Dow-Corning Corporation of Midland, Michigan, or polypropylene foam commercially available from Haveg Industries, Inc. of Wilmington, Delaware, or polyeythylene foam commercially available from Dow-Corning Company of Midland, Michigan.

The lubricating fluid 3 may be of any selected type, depending principally upon the use, operating conditions and atmospheric conditions in which the lubricant is to be utilized. For example, for many fractional horsepower motor applications, a lubricant such as is described in U.S. Pat. No. 3,466,244 as a "280-oil" may be utilized. The oil selected is mixed with a particulate polymeric material, such as wicking material 1, produced by comminuting polyurethane foam. Wicking material 1 is generally or substantially saturated with the lubricating fluid, with the wicking material forming about 20 percent by weight and the lubricant forming about 80 percent by weight of the lubricant composition. The lubricant composition 7 is then packed either by hand or by commercially available extruding apparatus, as well known in the art, into a bearing cavity, such as in an end shield of the character above described, to feed the lubricant fluid either directly or through a felt wick to lubricate a shaft and sleeve bearing or other bearing structure.

The following examples more particularly illustrate lubricant composition 7, and in the following Examples 1 and 2, the oil release characteristics of the lubricant composition are compared with the oil release characteristics of conventional wool felt oil wick utilized with the bearing structure. It should be understood that the examples are given by way of illustration and not by way of limitation.

EXAMPLE 1

As ester type polyurethane foam having approximately 60 pores per linear inch was comminuted until substantially all of the reduced particles thereof passed through a U.S. Standard Sieve series 5-mesh size screen, and a majority of the particles passed through a 20-mesh size screen. The resulting particulate polyurethane polymeric material mass was then thoroughly mixed with a "280" type lubricating oil, with the particulate polyurethane mass constituting about 30 percent by weight and the lubricating oil constituting about 70 percent by weight of the lubricant composition or mixture.

Figures 1, 6:
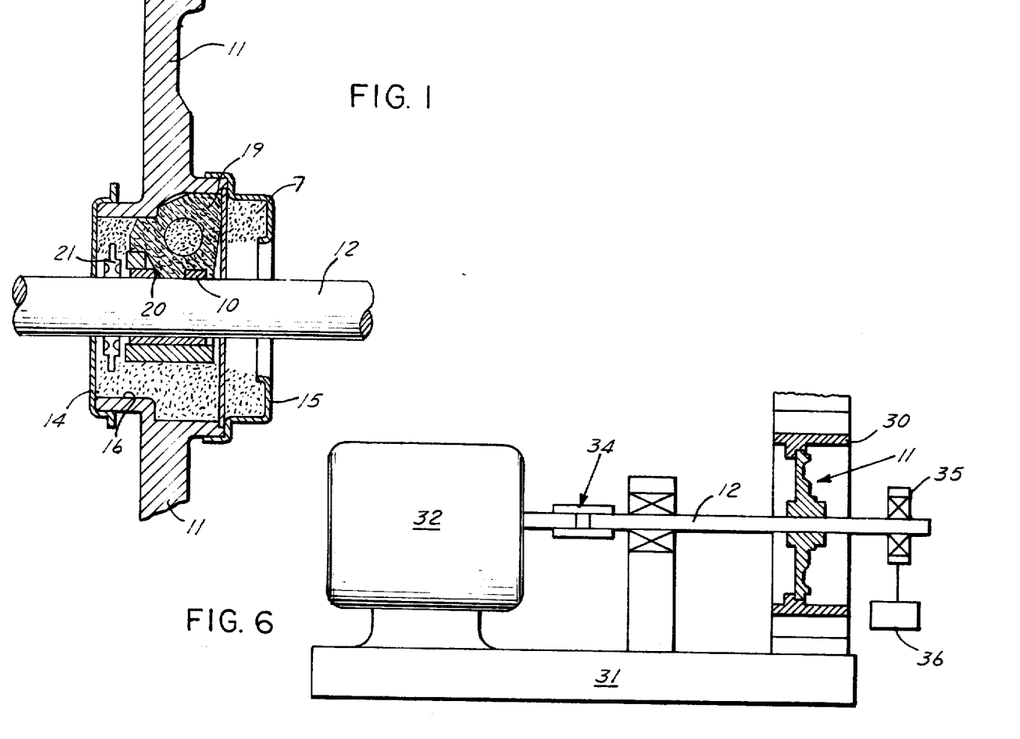
FIG. 1 is a sectional view of a bearing cavity illustrating a lubricating system in one form of the invention utilizing a lubricant composition in one form of the invention therein which may be formed in accordance to methods also in one form of the invention.
FIG. 6 is a diagrammatic representation of a reaction type dynamometer testing apparatus.
Figure 8:
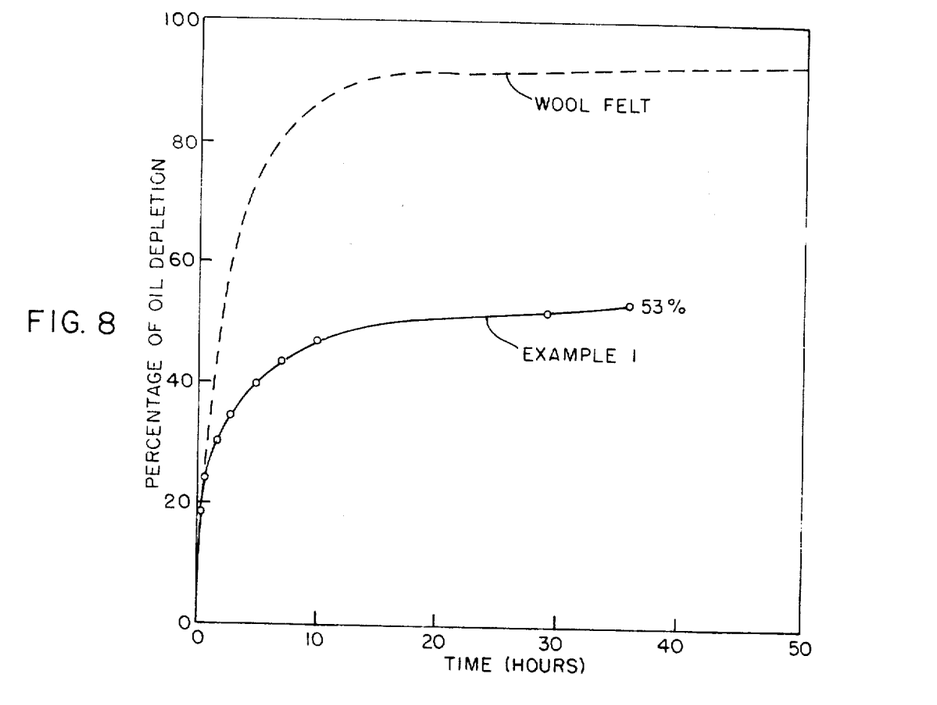
FIG. 8 is a graphic representation of the oil release characteristics of the lubricant composition of this invention compared with the oil release characteristics of oil impregnated wool felt.

The lubricant impregnated wicking material thus prepared was then packed into a General Electric Company 39-Frame motor end shield, of the type shown in FIG. 1, but modified to prohibit oil from recirculating to the bearing cavity. The end shield to be tested was mounted in a testing apparatus of the type shown in FIG. 6, and a bearing load of 45 pounds was applied to the shaft outboard of the bearing structure. The bearing temperature was maintained at 70° C. An on/off cycle of 4.75 minutes "on" to 0.25 minutes "off" was applied. The test results were plotted and are shown in solid lines in FIG. 8. The results shown in FIG. 8 were compared to the oil release rate of the wool felt, as measured in a similar test utilizing wool felt storage wicking material, as shown in dotted lines in FIG. 8. With reference to FIG. 8, it may be seen that during the first few hours the oil impregnated wicking material of the invention released oil at an excellent rate, that is at a rate sufficiently high to ensure proper bearing lubrication, while not so high as either to cause overflow of oil within the motor, or to overstress the oil readsorption rate capacity of the wicking material. After 37 hours, 53 percent of the oil was found to have been released from the lubricant composition 7 using the novel wicking material 1. The circled points along the curve indicated actual test measurements upon which the curve is based.

Figure 7:
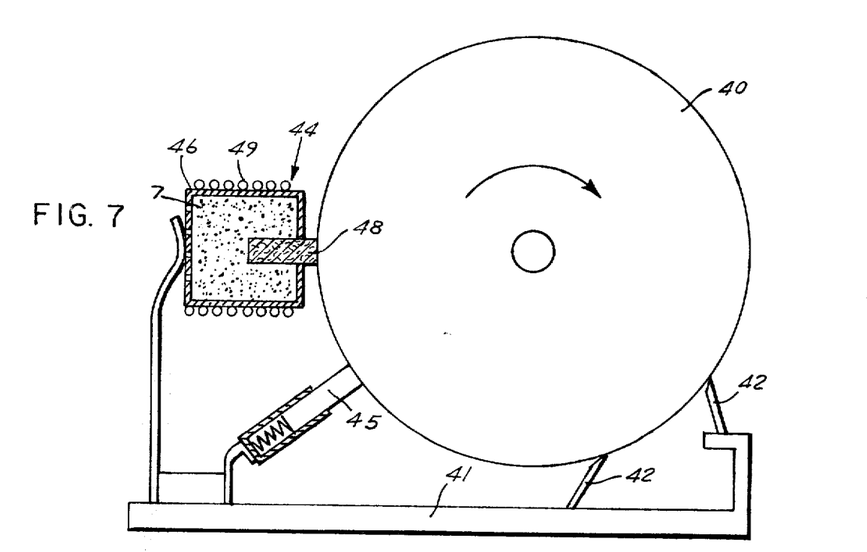
FIG. 7 is a diagrammatic representation of an oil release testing apparatus.

The test apparatus referred to is a dynamoeter test apparatus and is illustrated diagrammatically in FIG. 6. In this apparatus, General Electric 39-frame motor end shield 11 of the type shown in FIG. 1 is mounted in a cradle bearing 30 supported on a base 31 and attached to a torque measuring transducer (not shown). Shaft 12 driven by a motor 32 is supported adjacent one end by end frame 11 and bearing 10 thereof and by a rear support bearing 34 intermediate cradle bearing 30 and drive motor 32. Shaft 12 extends through test bearing 10 and supports at its outer end a load sustaining bearing 35 and a weight 36. Feeder wick 19, as shown in FIG. 1, is positioned above shaft 12 so that the weight 36, as shown in FIG. 7, is generally positioned approximately 180° from the feeder wick. Weight 36 may, however, be positioned at any other angular relationship with respect to feeder wick 19, depending upon the particular test conditions.

EXAMPLE 2

Figure 9:
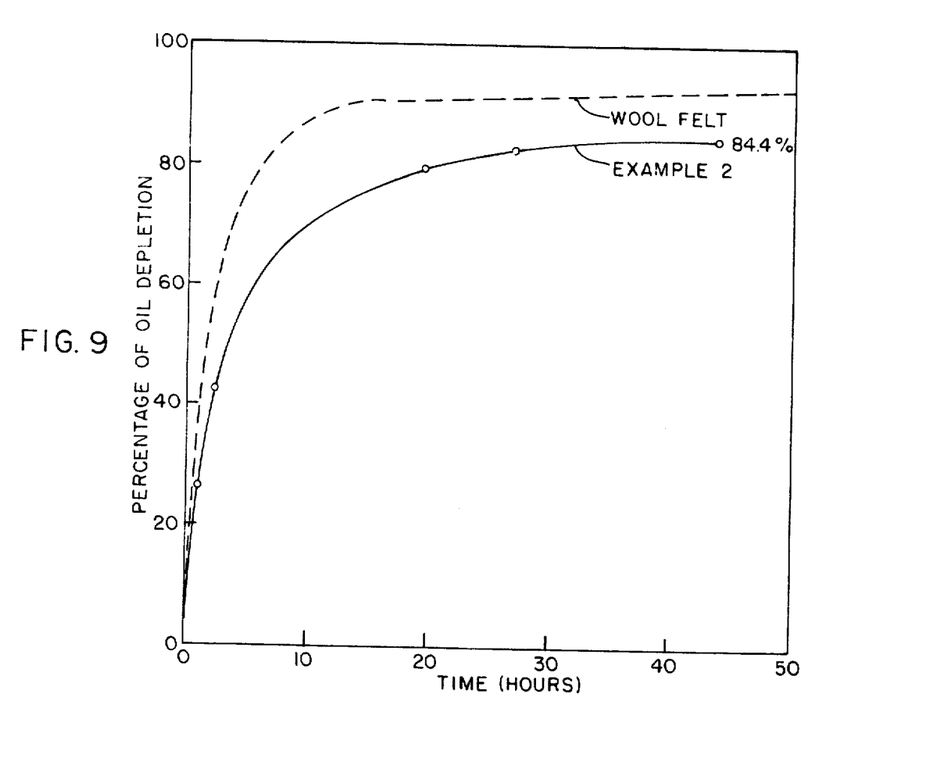
FIG. 9 is a graphic representation of oil release performance characteristics of oil impregnated felt compared with that of the lubricant composition of this present invention.

An ether type resilient polyurethane foam was comminuted, as described in Example 1 and in the specification above, and the resulting mass of particulate polyurethane material was then thoroughly mixed with type 280 bearing lubricating oil to form a lubrication composition containing about 20 percent by weight polyurethane particles and about 80 percent by weight lubricating oil. This lubricating oil impregnated wicking material 1 or lubricant composition 7 was then tested in a test apparatus simulating usage of such wicking material when lubricating the bearing of a General Electric Company 39-frame motor end shield. A schematic diagram of the testing apparatus utilized is shown in FIG. 7. Referring to FIG. 7, the test equipment included a 5½ inch steel wheel 40 having a one inch wide peripheral rim. Wheel 40 is rotatably mounted on a frame 41. A pair of oil scrapers 42 were mounted on frame 41 to remove oil picked up by peripheral rim wheel 40. A felt wiper 45 was mounted on frame 41 and positioned against the peripheral rim of wheel 40 to remove any remaining oil left by the scrapers. A test sample of the lubricating oil impregnated wicking material 1 or lubricant composition 7 was placed in a test unit, indicated generally at 44. Test unit 44 includes a container or tube 46 having a volume which approximated that of the lubricant reservoir in the 39-frame motor end shield of the type shown in FIG. 1. A felt feeder wick 48 extended through the end cap of container 46 to the peripheral rim of wheel 40. The opposite end of container 46 was capped with an end cap perforated to permit air pressure within tube 46 to be equalized with ambient air pressure. Aluminum heater coils 49 were wrapped about the exterior of container 46 and a thermocouple (not shown) was attached to control the temperature of the sample. With the test sample temperature maintained at 75° C, wheel 40 was rotated at a speed which, in connection with the area of feeder wick terminal surface, simulated a one-half inch shaft rotating at 1750 rpm in a 39-frame motor end shield bearing. Oil loss versus time was determined by periodically weighing sample container 46. The results of the test are shown in FIG. 9, with the test result being shown in a solid line and compared with an all felt system as shown in dotted lines. The results of the all felt system were provided with the test apparatus shown in FIG. 7 using oil impregnated wool felt as the test packing material.

EXAMPLE 3

A polyether type polyurethane foam was purchased from United Foam Co., Breman, Indiana. The foam was supplied as one-half inch flake. The input compositions for preparation of the foam were essentially 60 percent by weight polypropylene gylcol, having a molecular weight of about 3000, and 40 percent toluene di-isocyanate, together with small amounts of appropriate catalysts, blowing agents and foam stabilizers. The foam was comminuted or otherwise reduced in an Abbe orbital granulator, the cutting chamber of which consisted of two rotating knives and two stationary knives. The comminuted foam was sieved through a number of screens and, for two separate comminuting or reducing operations, particle size distributions were obtained as shown in Table I:

TABLE I

| Sieve Size | Opening (inches) | % by wt. retained | |
|---|---|---|---|
| | | A | B |
| 5 | .157 | — | — |
| 8 | .09 | 0.1 | 1.0 |
| 20 | .03 | 24.0 | 34.0 |
| 80 | .007 | 69.0 | 63.0 |
| 200 | .003 | 7.0 | 2.0 |

Each measurement listed in Table I is an average of at least three determinations. By way of illustration, the 69.0 percent by weight retained means that 69 percent of the particles were smaller than 30 mils (passed through a sieve size 20-mesh), but were larger than 7 mils (were retained on sieve size 80-mesh).

The oil selected for use in the lubricating composition was a 280-type oil, and particular oils included Sun 280 oil, Mobil 280 oil, and Sun 280-NW (spermless) oil.

The lubricant composition, tested as hereinafter described, was prepared in the following manner:

1. 200 parts by weight of polyurethane particles sized as described above in Table I were placed in a Hobart planetary mixer.
2. 800 parts by weight of the selected 280-type oil was added to the mixer.
3. The mixture of oil and polyurethane particles was mixed for a period of twenty minutes.

The lubricating oil impregnated polymeric wicking material thus produced according to Example 3, referred to hereinafter as the Example 3 lubricant composition, was then used as a bearing lubricant and was also tested for a variety of significant properties. Among the properties tested were:

Oil release

Extrudability and oil retention

Displacement of oil by water

In connection with each of the above tests, the test results for the Example 3 lubricant composition were compared to the results of like tests performed on a commercially available lubricant composition or lubricating oil impregnated wicking material, such as "Permawick FHH", produced in accordance with the Permawick Company patents discussed above. The same lubricating oil, Sun Oil 280-NW, was the lubricant involved in each of the wicking materials. The commercial wicking material Permawick FHH was observed to be a celluosic, fibrous, wicking material containing 83 to 86 percent by weight Sun 280 oil, and 14 to 17 percent by weight fiberous wicking filler material.

In addition to the above mentioned properties, the Example 3 lubricant composition was compared to the Permawick FHH commercial material with respect to other properties deemed to be of less significance than those enumerated above, and was in each instance found to be comparable to the Permawick FHH material.

Figure 10:
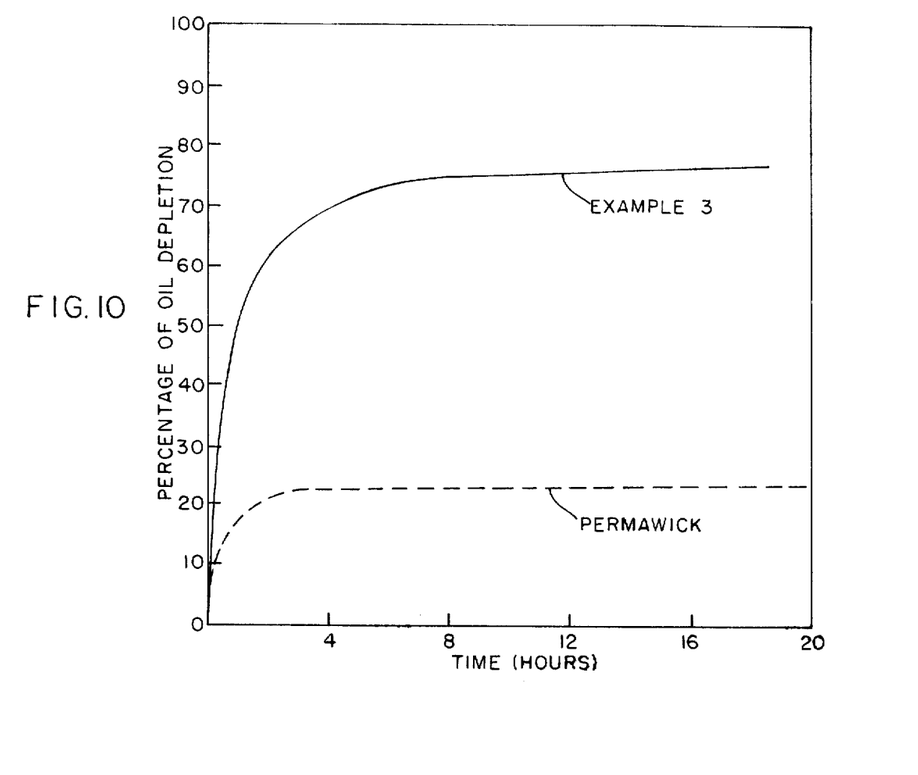
FIG. 10 is a graphic representation of oil release performance characteristics of the lubricant composition of this invention compared with that of a commercially available lubricant composition.

The oil release characteristics of the Example 3 lubricant composition were obtained by utilizing the oil release testing apparatus shown in FIG. 7. Test container or tube 46 containing the wicking material formulation was maintained at 75° C and was weighed periodically to determine the amount of oil that was transferred to rotating wheel 40. The amount of available oil loss was then plotted as a function of time (FIG. 10). The ability of the Example 3 lubricant composition to release oil, as measured by the oil release tester, is further shown in FIG. 10, compared the similar oil release ability of Permawick FHH. Both samples were hand-picked and the test tube or container 46 contained the same amount of material. It was observed that the Example 3 lubricant composition pumped 77 percent of available oil, while the Permawick FHH material pumped 23 percent of available oil.

Oil release data were also obtained from end shields 11 constructed as shown in FIG. 1 and having the bearing cavity 16 thereof packed with the Example 3 lubricant composition. For comparison, similar end shields 11 were packed with Permawick FHH lubricant material. In both cases, the bearing cavities 16 were packed by utilizing conventional commercial lubricant extrusion equipment. The packed end shields 11 were then mounted in the reaction dynamometer, shown diagrammatically in FIG. 6, with a load applied on shaft 12 outboard of bearing 10 of the packed end shield. The bearing temperature was maintained at 70° C. Shaft 12 was rotated at a speed of 1200 rpm, and cycled 4.75 minutes on and 0.25 minutes off. All loads were applied 180° from the window of bearing 10 and felt feeder wick 19. Bearings 10 were initially loaded at 45 pounds, and the load was only changed when "coaxing" more oil from the bearing. The direction of rotation (clockwise "CW" or counter clockwise "CCW") was also varied in order to coax more oil from bearings 10. As initially packed, the Permawick FHH packed end shields 11 contained 21.4 grams of lubricant (17.7 grams of oil) while the end shields packed with the Example 3 lubricant composition contained 20.7 grams of lubricant (16.4 grams of oil). The comparative oil release data as obtained are tabulated in Tables II and III. It will be noted that the lubricant prepared according to the present invention released approximately 50 percent of available oil while the Permawick lubricated bearing released only approximately 34 percent of available oil.

TABLE II

OIL RELEASE ON 39 FRAME — MACHINE PACKED BEARINGS
PERMAWICK FHH WITH SUN OIL 280-NW

| Bearing No. 1 | | | | Bearing No. 2 | | | | Bearing No. 3 | | | |
|---|---|---|---|---|---|---|---|---|---|---|---|
| Time (hrs.) | Oil pumped (grams) | Load (lbs.) | Rotation | Time (hrs.) | Oil pumped (grams) | Load (lbs.) | Rotation | Time (hrs.) | Oil pumped (grams) | Load (lbs.) | Rotation |
| .25 | .526 | 45 | CCW | .25 | 1.008 | 45 | CW | .20 | .666 | 45 | CCW |
| .50 | .822 | | | .50 | 2.286 | | | .70 | 1.120 | | |
| 1.00 | 1.204 | | | .75 | 3.222 | | | 1.70 | 1.306 | | |
| 1.50 | 1.462 | | | 2.00 | 4.893 | | | 3.50 | 1.437 | | |
| 2.50 | 1.801 | | | 7.30 | 5.071 | | | 5.20 | 1.578 | | CW |
| 3.50 | 2.066 | | | 18.75 | 5.071 | | | 6.10 | 3.560 | | |
| 5.00 | 2.224 | | CW | 19.25 | 5.365 | | CW | 6.90 | 4.383 | | |

Table II—Continued

OIL RELEASE ON 39 FRAME — MACHINE PACKED BEARINGS
PERMAWICK FHH WITH SUN OIL 280-NW

| Time (hrs.) | Bearing No. 1 Oil pumped (grams) | Load (lbs.) | Rotation | Time (hrs.) | Bearing No. 2 Oil pumped (grams) | Load (lbs.) | Rotation | Time (hrs.) | Bearing No. 3 Oil pumped (grams) | Load (lbs.) | Rotation |
|---|---|---|---|---|---|---|---|---|---|---|---|
| 6.00 | 3.093 | | | 20.25 | 5.420 | | | 22.20 | 5.103 | | |
| 7.00 | 3.419 | | | 22.25 | 5.420 | | | 24.40 | 5.150 | | CCW |
| 8.00 | 3.442 | | CCW | 23.25 | 5.420 | | CW | 27.90 | 5.166 | 31 | CYC* |
| 23.50 | 3.470 | | CW | | | | | 29.10 | 5.565 | | |
| 25.00 | 3.727 | | | | | | | 30.80 | 5.915 | | |
| 26.00 | 3.738 | | | | | | | 46.10 | 6.336 | 27 | |
| 27.50 | 3.768 | | | | | | | 51.70 | 6.738 | | |
| 28.50 | 3.768 | | CW | | | | | 62.90 | 6.800 | | |
| 33.00 | 4.321 | 24 | CYC* | | | | | 66.70 | 6.964 | 15 | |
| 49.00 | 5.299 | | | | | | | 69.80 | 7.213 | | |
| 50.05 | 5.514 | 30 | CCW | | | | | 85.10 | 7.385 | | |
| 52.50 | 5.525 | | | | | | | 109.1 | 7.440 | 6 | |
| 53.50 | 5.525 | | | | | | | 137.8 | 7.440 | | |
| Total Oil Released = 31% | | | | Total Oil Released = 30% | | | | Total Oil Released = 41% | | | |

*CYC — direction of rotation changed every cycle (5 min.)

TABLE III

OIL RELEASE ON 39 FRAME — MACHINE PACKED BEARINGS
EXAMPLE 3 LUBRICANT COMPOSITION WITH SUN OIL 280-NW

| Time (hrs.) | Bearing No. 1 Oil pumped (grams) | Load (lbs.) | Rotation | Time (hrs.) | Bearing No. 2 Oil pumped (grams) | Load (lbs.) | Rotation | Time (hrs.) | Bearing No. 3 Oil pumped (grams) | Load (lbs.) | Rotation |
|---|---|---|---|---|---|---|---|---|---|---|---|
| .2 | .382 | 45 | CW | .1 | 1.374 | 45 | CCW | .1 | .273 | 45 | CCW |
| .4 | .383 | 45 | | .3 | 2.362 | | | .3 | .910 | | |
| 2.2 | .387 | 45 | | .5 | 2.870 | | | .6 | 1.598 | | |
| 3.0 | 1.289 | 30 | | .75 | 3.398 | | | 1.0 | 2.192 | | |
| 4.3 | 1.795 | 30 | | 1.00 | 3.772 | | | 1.5 | 2.703 | | |
| 5.8 | 2.024 | 30 | | 1.25 | 4.057 | | | 2.0 | 3.118 | | |
| 6.4 | 2.124 | 30 | | 1.50 | 4.318 | | | 2.6 | 3.408 | | |
| 6.9 | 3.345 | 45 | CCW | 1.75 | 4.547 | | | 7.6 | 3.946 | | |
| 7.9 | 4.779 | 45 | | 2.00 | 4.724 | | | 18.0 | 4.221 | | CW |
| 23.1 | 8.579 | 45 | | 2.85 | 5.085 | | | 19.0 | 4.977 | | |
| 28.3 | 8.677 | 45 | | 3.4 | 5.227 | | | 20.0 | 5.373 | | |
| | | | | 4.1 | 5.461 | | | 21.5 | 5.642 | | |
| | | | | 5.2 | 5.801 | | | 23.0 | 5.870 | | |
| | | | | 6.0 | 5.948 | | | 25.7 | 5.991 | | CCW |
| | | | | 6.8 | 6.057 | | | 26.5 | 6.023 | 30 | |
| | | | | 22.2 | 6.772 | | | 32.0 | 6.742 | | |
| | | | | 24.0 | 7.331 | | | 36.9 | 7.270 | | |
| | | | | 26.0 | 7.729 | | | | | | |
| | | | | 28.0 | 8.057 | | | | | | |
| | | | | 30.0 | 8.090 | | CW | | | | |
| | | | | 46.0 | 8.092 | | CCW | | | | |
| | | | | 50.0 | 8.542 | | | | | | |
| Total oil released = 52% | | | | Total oil released = 51% | | | | Total oil released = 44% | | | |

The extrudability and oil retention characteristics of the Example 3 lubricant composition were evaluated by determining if runoff or draining of oil occurred after the Example 3 lubricant composition was extruded. For this test, the Example 3 lubricant composition was extruded onto a screen, the extrudate and screen were placed over an aluminum dish, and the amount of oil that drained at 75°C and at room temperature was recorded. The test extrusion apparatus consisted of two cylinders, the longer of which was 7 inches long with a three-eighths inch bore. The top of this cylinder was placed below and butted against another cylinder 3 inches long having a three-fourths inch bore. Extrusion tests were thus made with metered flow from a large diameter to a small diameter in order to simulate the action of the commercially available lubricant wicking material extrusion machines. While only qualitative information was obtained, it was noted that the Example 3 lubricant composition had good integrity and had a uniform degree of wetness or oil distribution. In the screening tests, when the extrudate was placed on a screen at 75°C and at room temperature, there was no oil detected in the aluminum cups. Similarly, end shields packed with the Example 3 lubricant composition under commercial extrusion conditions likewise did not lose oil when held in a oven, hub down, at 75° C. for 2 weeks.

The displacement of lubricating oil from the Example 3 lubricating composition, by water, was evaluated by immersion tests and wash-out tests. A simple immersion test was devised to determine the effect of water on the Example 3 lubricant composition. A comparison was made with the Permawick FHH material. Both materials utilized Sun Oil 280-NW lubricating oil. In the water displacement tests, both machine packed 39-Frame end shields 11 of the type shown in FIG. 1, as well as loose or uncompacted lubricant wicking materials, were tested. In each test, the amount of oil contained in the lubricant was determined after immersion in distilled water for a given time period. After immersion, the lubricant was heated at 75° C. until all water was removed. The difference between the original weight and the final weight was taken as a quantitative measure of the oil displaced.

In one form of the immersion test, approximately 20 grams of loose, uncompacted lubricant charged wicking material was weighed into a 250 cc beaker. A porous polyurethane plug was, in each case, inserted about half-way down the beaker to prevent the lubricant wicking material from floating. After inserting the plug, distilled water was added to the 200 cc mark. The beakers were maintained at room temperature at 50° C. for from 1 to 5 hours. The comparative test results for the Example 3 lubricant composition and the Permawick FHH lubricant compositions are presented in Table IV.

TABLE IV

COMPARISON OF EXAMPLE 3 LUBRICANT COMPOSITION AND PERMAWICK FHH WITH SUN OIL 280-NW RELATIVE TO OIL DISPLACEMENT BY WATER

| Sample | Wt. | Time (hours) | Temp. | % Oil Lost |
|---|---|---|---|---|
| Example 3 | 20.33 g. | 1 | 50°C | .89 |
| " | 21.36 | 3 | 50°C | 1.04 |
| " | 21.78 | 5 | 50°C | 1.51 |
| " | 21.35 | 1 | 20°C | .99 |
| " | 21.66 | 3 | 20°C | 1.35 |
| " | 21.10 | 5 | 20°C | 1.38 |
| Permawick | 20.69 | 1 | 50°C | 8.0 |
| " | 20.53 | 3 | 50°C | 14.6 |
| " | 21.58 | 5 | 50°C | 21.0 |
| " | 21.23 | 1 | 20°C | 34.6 |
| " | 20.97 | 3 | 20°C | 44.3 |
| " | 21.52 | 5 | 20°C | 42.5 |

Oil displacement comparisons were also made on the 39-Frame type end shields 11 as machine packed with the lubricant wicking materials. The packed end shields were immersed in water at 20°C. with the results shown in Table V.

TABLE V

| Oil Displacement on 39-Frame End Shields | | | | |
|---|---|---|---|---|
| | Oil Start | Oil Remaining after 7 hrs. | Oil Remaining after 40 hrs. | % Loss (40 hrs.) |
| Permawick FHH with Sun Oil 280-NW | 17.7 g. | 8.9 g. | 6.8 g. | 61% |
| Example 3 | 16.4 g. | 14.5 g. | 14.1 g. | 15% |

The water-washout characteristics of the Example 3 lubricant material were determined by dripping distilled water onto the top end of a bearing, while running, and collecting the oil and/or water overflowing the top of the oil well cover. For this purpose, 39-Frame type bearings 10 of the character shown in FIG. 1, with machine packed lubricant impregnated wicking material were mounted on a shaft extension of a vertical 39-Frame type motor and positioned against a thrust collar pressed on the shaft extension (not shown). Bearings 10 were operated at 1600 rpm and maintained at a temperature of 50±2°C., with a radial load of 10 pounds opposite the feed wick. Distilled water was injected in bearing 10 with a hypodermic needle along side shaft 12 onto the outboard oil thrower 21, which had been pushed in as close to the bearing as possible. A Sage syringe pump with a 30 cc B and D syringe was used to control the water flow rate. A plastic tent was placed over the test setup and open dishes of water were inserted to increase humidity. Relative humidity was maintained between 60 and 76 percent. The test bearing and motor was tilted a few degrees so that overflow oil or water dropped to one side of the oil well cover, from which it was funneled into a graduate. Water flow rate was maintained at 4.5 cc per hour for an 18 cc total water flow. The test was conducted over a period of four hours. The collected overflow may be summarized as follows:

Example 3 lubricant composition - 4.0 cc oil, 8.5 cc water
Permawick lubricant composition - 7.5 cc oil, 6 cc water The oil obtained from the Example 3 lubricant composition was more of an oil-water emulsion than was the oil from the Permawick packed bearing. In repeat tests, the difference noted above was not always as pronounced, although the relationship was always the same. An increase in temperature appeared to decrease the difference in oil extraction. Further investigation revealed that the rate of oil replacement by water in a bearing is greatly affected by the ease with which a path or channel for the water is developed through the packing. After such a path is established, water passes through quickly while oil replacement in adjacent areas proceeds at a slower pace. Tests in glass tubes showed that a water path is more quickly established in the comminuted foam material of the Example 3 lubricant composition than in the fibrous Permawick lubricant composition in which the water tends to spread out.

Lubricant compositions utilizing wicking materials of this invention, as above described are suitable for a wide variety of uses, in various apparatus, with particular emphasis on the lubrication of bearings of fractional horsepower motors. The lubricant composition may be used alone or in combination with a felt feeder wick. The lubricant composition is capable of feeding a major proportion of its retained lubricating oil or lubricant fluid to the bearing with which it is utilized. Moreover, the lubricant composition is highly suitable for use in automated manufacturing operations and, in particular, is suitable for use with extrusion machines of the type which are commercially utilized to inject lubricant compositions directly into bearing cavities of fractional horsepower motors during the manufacture thereof.

From the foregoing, it is now apparent that a novel wicking material, lubricant composition, method of forming such, and lubrication system are provided meeting all of the objects and advantageous features set forth hereinabove, as well as others, and that changes in the compositons and the arrangements, shapes and details thereof, as well as variance in the methods for forming such, may be made by those skilled in the art without departing from the spirit and scope of the invention, as set out in the claims which follow.

What I claim as new and desire to secure by letters patent of the United States is:

1. A lubricant retaining and wicking material for releasably retaining a liquid lubricant comprising a mass of discrete, non-fibrous, multi-digited, resilient-type foam particles wherein a major portion of the particles are within a size range between approximately 20-mesh and approximately 80-mesh with the remaining particles of the mass having sizes generally between about 5-mesh and about 200-mesh exclusively of the major portion size range.

2. A wicking material as set forth in claim 1, wherein the foam particles are polyurethane foam.

3. A wicking material as set forth in claim 2, wherein the polyurethane foam is an ether type.

4. A wicking material as set forth in claim 2, wherein the polyurethane foam is an ester type.

5. A wicking material as set forth in claim 1, wherein the foam particles are a polymeric foam.

6. A wicking material as set forth in claim 1, wherein the foam particles of the particulate mass have a size in a range from approximately 8-mesh to approximately 80-mesh.

7. A wicking material as set forth in claim 1, wherein the foam particles are substantially inert to and insoluble in liquid lubricant.

8. A wicking material as set forth in claim 1, wherein ruptured cell ribs and cell walls of the cellular structure of the foam particles define the multi-digited characteristic thereof.

9. A wicking material as set forth in claim 1, wherein fractured cellular structures of the foam particles define the multi-digited characteristic thereof.

10. A lubricant composition for lubricating a component which may be communicated therewith comprising a mixture of a liquid lubricant and means for both retaining and releasing the liquid lubricant adapted to effect the lubrication of the component, the retaining and releasing means being generally constituted by a particulate mass of discrete, non-fibrous, multi-digited, resilient-type foam particles.

11. A lubricant composition as set forth in claim 4, wherein the foam particles have the capacity to release up to about 85 percent of the liquid lubricant retained thereby.

12. A lubricant composition as set forth in claim 9, wherein a plurality of fractured cells of the cellular structure of the foam particles define the multi-digited characteristic thereof.

13. A lubricant composition as set forth in claim 12, wherein the liquid lubricant is releasably retained by the foam particles generally in at least some portions of the fractured cells of the cellular structure thereof.

14. A lubricant composition as set forth in claim 9, wherein a plurality of ruptured cell ribs and cell walls of the cellular structure of the foam particles define the multi-digited characteristic thereof.

15. A lubricant composition as set forth in claim 12, wherein the liquid lubricant is releasably retained by the foam particles generally between at least some of the ruptured cell ribs and cell walls thereof.

16. A lubricant composition as set forth in claim 9, wherein the foam particles have a particulate size generally between approximately 5-mesh and approximately 200-mesh.

17. A lubricant composition as set forth in claim 9, wherein the foam particles have a particulate size generally smaller than about 8-mesh and generally larger than about 80-mesh.

18. A lubricant composition as set forth in claim 9, wherein a major portion of the foam particles have a size smaller than generally about 20-mesh and larger than generally about 80-mesh.

19. A lubricant composition as set forth in claim 18, wherein the major portion comprises generally about 65 to about 85 percent of the foam particles.

20. A lubricant composition as set forth in claim 9, wherein the foam particles are a polyurethane foam.

21. A lubricant composition as set forth in claim 18, wherein the polyurethane foam is an ether type.

22. A lubricant composition as set forth in claim 18, wherein the polyurethane foam is an ester type.

23. A lubricant composition as set forth in claim 9, wherein the foam particles are a polymeric foam.

24. A lubricant composition as set forth in claim 9, wherein the foam particles are substantially inert to and insoluble in the liquid lubricant.

25. A lubricant composition as set forth in claim 9, wherein the mixture contains between approximately 20 percent and approximately 30 percent by weight of the foam particles and between approximately 70 percent and approximately 80 percent by weight of the liquid lubricant.

26. A method of forming a lubricant composition adapted for lubricating a component which may be communicated therewith comprising the steps of:
   a. reducing a resilient-type foamed polymer material to a particulate mass of discrete, non-fibrous, multi-digited, resilient-type foam particles; and
   b. saturating generally the resilient-type foam particles with a liquid lubricant by mixing them together thereby to form the lubricant composition.

27. The method as set forth in claim 24, wherein the saturating step further comprises proportioning the particulate mass and the liquid lubricant in a ratio of about 20 percent to about 30 percent by weight of the particles and about 70 percent to about 80 percent by weight of the liquid lubricant.

28. The method as set forth in claim 24, wherein the resilient-type foam particles created during the reducing step have a particulate size of between approximately 5-mesh and approximately 200-mesh.

29. The method as set forth in claim 26, wherein the foamed polymer material is a polyurethane polymer.

30. A method of forming a lubricant composition comprising the steps of:
   a. reducing a resilient-type foamed polymer material to a particulate mass of discrete, non-fibrous, multidigited, resilient-type foam particles;
   b. mixing at least a portion of the particulate mass with a liquid lubricant; and
   c. comminuting further the foam particles and liquid lubricant mixture and thereby forming the lubricant composition.

31. The method as set forth in claim 24, wherein the foamed polymer material is selected from a group consisting of ester type polyurethane polymers and ether type polyurethane polymers.

32. The method as set forth in claim 24, wherein the reducing step further comprises comminuting the foamed polymer into the foam particle wherein a major portion thereof have a particulate size generally smaller than about 20-mesh and generally larger than about 80-mesh.

33. The method as set forth in claim 24, wherein the reducing step further comprises fracturing at least most of the cells of the cellular structure of the foamed polymer material for effecting the multi-digited characteristic of the foam particles.

34. The method as set forth in claim 31, wherein the saturating step further comprises releasably retaining the liquid lubricant generally in at least some portion of the fractured cells of the foam particles.

35. The method as set forth in claim 24, wherein the reducing step further comprises rupturing at least most of the cell ribs and cell walls of the cellular structure of the foam material for effecting the multi-digited characteristic of the foam particles.

36. The method as set forth in claim 33, wherein the saturating step further comprises releasably retaining the liquid lubricant generally between at least some of the ruptured cell ribs and cell walls of the foam particles.

* * * * *

UNITED STATES PATENT OFFICE
CERTIFICATE OF CORRECTION

PATENT NO. : 3,894,956

DATED : July 15, 1975

INVENTOR(S) : James A. Whitt

It is certified that error appears in the above-identified patent and that said Letters Patent are hereby corrected as shown below:

Col. 1, line 53, delete "described" and insert --describe--;
       line 53, delete "permawick" and insert --"permawick"--.
Col. 2, line 46, after "hereinbefore" insert --,--.
Col. 3, line 2, delete "a" and insert --the-- (first occurrence);
       line 3, delete "the" and insert --a--;
       line 10, after "general," insert --a--;
       line 10, after "material" insert --in one form--;
       line 28, after "lubricant" delete ",";

line 32, after "discrete" insert --,--;
       line 33, delete "digital" and insert --digited--;
       line 34, delete "are" and insert --may be--;
       line 40, delete "and" and insert --percent to--;
       line 41, after "20" insert --percent--;
       line 48, after "multi-digited" insert --,--;
       line 57, start a new paragraph beginning with the word "Further".
Col. 4, line 6, delete "multidig-" and insert --multi-dig- --;
       line 58, after "multi-digital," insert --resilient or--;
       line 60, delete "of this" and insert --in one form of the--.
Col. 7, line 56, delete "indicated" and insert --indicate--.
Col. 8, line 26, delete "is" and insert --was--.
Col. 9, line 56, delete "Permawick FHH" and insert --"Permawick FHH"--.
Col. 10, line 40, delete "on" and insert --"on"--;
       line 40, delete "off" and insert --"off"--.
Col. 13, line 63, after "60" insert --percent--.
Col. 15, line 31, delete "4" and insert --10--;
       line 35, delete "9" and insert --10--;
       line 43, delete "9" and insert --10--;
       line 47, delete "12" and insert --14--;
       line 51, delete "9" and insert --10--;

UNITED STATES PATENT OFFICE
CERTIFICATE OF CORRECTION

PATENT NO. : 3,894,956
DATED : July 15, 1975
INVENTOR(S) : James A. Whitt

It is certified that error appears in the above-identified patent and that said Letters Patent are hereby corrected as shown below:

Col. 15, line 55, delete "9" and insert --10--;
line 59, delete "9" and insert --10--;
line 66, delete "9" and insert --10--;
line 68, delete "18" and insert --20--.
Col. 16, line 1, delete "18" and insert --20--;
line 3, delete "9" and insert --10--;
line 5, delete "9" and insert --10--;
line 8, delete "9" and insert --10--;
line 23, delete "24" and insert --26--;
line 29, delete "24" and insert --26--;
line 39, delete "tidigited" and insert --ti-digited--;
line 45, delete "24" and insert --26--;
line 49, delete "24" and insert --26--;
line 55, delete "24" and insert --26--;
line 60, delete "31" and insert --33--;
line 64, delete "24" and insert --26--;
line 69, delete "33" and insert --35--.

Signed and Sealed this second Day of December 1975

[SEAL]

Attest:

RUTH C. MASON
Attesting Officer

C. MARSHALL DANN
Commissioner of Patents and Trademarks